(12) United States Patent
Murgoci

(10) Patent No.: US 11,264,875 B2
(45) Date of Patent: Mar. 1, 2022

(54) ROTOR FOR AN ELECTRIC MACHINE OF A VEHICLE

(71) Applicant: Vitesco Technologies GMBH, Hannover (DE)

(72) Inventor: Dragos Murgoci, Iasi (RO)

(73) Assignee: VITESCO TECHNOLOGIES GMBH, Hannover (DE)

( * ) Notice: Subject to any disclaimer, the term of this patent is extended or adjusted under 35 U.S.C. 154(b) by 76 days.

(21) Appl. No.: 16/798,777

(22) Filed: Feb. 24, 2020

(65) Prior Publication Data

US 2020/0195110 A1 Jun. 18, 2020

Related U.S. Application Data

(63) Continuation of application No. PCT/EP2018/071385, filed on Aug. 7, 2018.

(30) Foreign Application Priority Data

Aug. 22, 2017 (EP) .................................. 17465540

(51) Int. Cl.
*H02K 21/02* (2006.01)
*H02K 1/27* (2006.01)
*H02K 1/2786* (2022.01)

(52) U.S. Cl.
CPC ......... *H02K 21/025* (2013.01); *H02K 1/2786* (2013.01)

(58) Field of Classification Search
CPC ........................... H02K 21/222; H02K 1/2746

USPC .................. 310/156.01, 83, 156.35, 191
See application file for complete search history.

(56) References Cited

U.S. PATENT DOCUMENTS

| 5,331,244 | A  | * | 7/1994 | Rabe ............... H02K 21/12 310/180 |
|---|---|---|---|---|
| 7,159,295 | B2 |   | 1/2007 | Lau |
| 2006/0091752 | A1 |   | 5/2006 | Adaniya et al. |
| 2013/0134819 | A1 |   | 5/2013 | Min et al. |

FOREIGN PATENT DOCUMENTS

| CN | 1427524 A | 7/2003 |
|---|---|---|
| CN | 1595770 A | 3/2005 |
| CN | 1738153 A | 2/2006 |
| CN | 102510137 A | 6/2012 |
| CN | 103138418 A | 6/2013 |
| DE | 102012201347 A1 | 8/2013 |

OTHER PUBLICATIONS

Chinese Office Action dated Aug. 3, 2021 for corresponding Chinese Patent Application No. 20180054165.3.

* cited by examiner

*Primary Examiner* — Jose A Gonzalez Quinones

(57) ABSTRACT

A rotor for an electric machine of a vehicle. The rotor includes permanent magnets, receptions for the permanent magnets and deformation components. The permanent magnets are adapted to be deformed elastically and are arranged within the receptions, which are designed such that the permanent magnets may deform within the receptions. The deformation components are adapted to deform the permanent magnets such that at least one of a magnetic induction, a conductor length and a rotor radius is adjusted.

9 Claims, 5 Drawing Sheets

ROTOR FOR AN ELECTRIC MACHINE OF A VEHICLE

CROSS-REFERENCE TO RELATED APPLICATIONS

This application claims priority to PCT Application PCT/EP2018/071385, filed Aug. 7, 2018, which claims priority to European Patent Application No. EP 17465540.7, filed Aug. 22, 2017. The disclosures of the above applications are incorporated herein by reference.

FIELD OF THE INVENTION

The invention relates to a rotor for an electric machine of a vehicle. Further, the invention relates to an electric machine including the rotor. Additionally, the invention is directed to a powertrain including the electric machine and to a vehicle including the powertrain.

BACKGROUND OF THE INVENTION

In general, a variation of torque M and rotation speed of a rotor shaft of an electric machine (motor/generator) imposes a variation of electric current I. The variation of rotation speed is typically done in narrow range. The available electric current I and voltage V of an electric machine are limited due to a generation of JOULE heat. According to the LORENTZ law, the electromagnetic force F (also referred to as LORENTZ force) is calculated by the following formula:

$$F = B \times I \times L.$$

In this formula
B is the magnetic induction,
I is the electric current, and
L is a length of a conductor, e.g. a permanent magnet.
The torque M at the rotor shaft is calculated (simplified) by the following formula:

$$M = n \times F \times R.$$

In this formula
n is the number of rotor conductors, e.g. permanent magnets,
F is the electromagnetic force (calculated as above), and
R is the rotor radius.

Thus, torque M especially depends on the electromagnetic force F (B, I, L). In order to increase the electromagnetic force F, it is necessary to increase the magnetic induction B and/or the electric current I and/or the length of the conductor L. Up to now, the only way for increasing torque M is to increase the electric current I. However, increasing the electric current I is limited due to generation of JOULE heat, which may lead to an overheating of the electric machine, and to a damage/destruction of the motor/generator.

SUMMARY OF THE INVENTION

It is an object of the present invention to provide a rotor for an electric machine of a vehicle, wherein the rotor may provide a higher electromagnetic force and torque without the risk of overheating of the electric machine.

The problem is solved by the subject matter according to disclosure. There are various embodiments of the invention described. The present invention proposes a special rotor construction with permanent magnets (conductors). The electric machine is operated as a motor or as a generator, in order to fulfil respective needs. The permanent magnets may be elastically deformed in a rotor in order to obtain a variable magnetic induction B, conductor length L and rotor radius R. These parameters contribute into above described formula for the torque M at the rotor shaft. The special rotor construction allows to keep the stator current in a safe region regarding JOULE heat, thereby avoiding an overheating and damage/destruction of the electric machine. Furthermore, even the torque is increased due to a respective increase of parameters B, L and R.

With this in mind, according to a first aspect of the invention, a rotor for an electric machine of a vehicle is provided. The rotor includes permanent magnets, receptions for the permanent magnets and deformation components. The permanent magnets are adapted to be deformed elastically and are arranged within the receptions, wherein the receptions are designed such that the permanent magnets may deform within the receptions. The deformation components are adapted to deform the permanent magnets, e.g. from a rectangular shape into a non-rectangular shape, such that at least one of a magnetic induction B, a conductor length L and a rotor radius R is adjusted.

The torque M and rotation speed n of the rotor is varied in a large range at lower electric stator currents I. The rotor according to the first aspect of the invention further enables to decrease the current I when high torques M are demanded, especially when the electric machine is driven constantly at a maximum rotational speed nmax. This has a huge positive impact on battery time charging, discharging, consumption as well as battery lifetime and power electronics protection (as high JOULE heat effects are avoided, see above).

According to an embodiment of the invention, the permanent magnets are made of a rubber ferrite. Rubber ferrite may populate the permanent magnets in various modes to obtain diverse magnetic fields, e.g. depending on a position of the deformation components on an x-axis (such as a longitudinal axis of the rotor shaft), to fulfil requested targets for characteristics of an electric machine.

Also, the permanent magnets may include windings inserted into an elastic matrix material. This embodiment may fulfil high power needs.

In another embodiment of the invention, the deformation components include an axial cam. The axial cam is adapted to be moved, e.g. by respective mechanical means, forwards and backwards in an axial direction of the rotor (e.g. an x-axis, such as a longitudinal axis of the rotor shaft), wherein a forward movement of the axial cam leads to a deformation of the permanent magnets such that at least one of the magnetic induction B, the conductor length L and the rotor radius R is increased. This construction is very simple and reliable. By moving the axial cam forward, the permanent magnets are compressed and deformed such that they have a new shape due to the axial position/stroke of the axial cam. The shape of the permanent magnets may depend on a position of the deformation components on an x-axis (such as a longitudinal axis of the rotor shaft).

According to another embodiment of the invention, the axial cam is adapted to be moved backwards in the axial direction of the rotor, wherein a backward movement of the axial cam leads to a back-deformation of the permanent magnets such that at least one of the magnetic induction B, the conductor length L and the rotor radius R is decreased.

According to a second aspect of the present invention, an electric machine is provided, wherein the electric machine includes a rotor according to the first aspect of the invention. The electric machine provides the function of a continuous variation machine (reducer/multiplier), e.g. depending on a position of the deformation components on an x-axis (such as a longitudinal axis of the rotor shaft), and the electric current parameter I. Thus, an extra gearbox is not necessary. Therefore, the electric machine is very compact, simple and cheap. The electric machine is handled and controlled easily. Furthermore, the electric machine is operated efficiently as no reduce is needed and nearly no vibrations and heat developed from the magnetic field vibrations occur.

The electric machine is implemented e.g. in 48V car projects as a belt starter generator (BSG). Furthermore, the electric machine is used as a motor for an electromagnetic brake (dry break) instead of a gearbox. Also, the electric machine is used as a motor for a steering rack or for VED applications.

In an embodiment, the rotor further includes a rotor shaft and a stator. In this embodiment, the deformation components are adapted to deform the permanent magnets such that a current in the stator remains at a constant level, and—at the same time—a torque of the rotor shaft is increased. Thus, a very high torque is generated, wherein the stator current is kept securely below a critical temperature.

Additionally or alternatively, the deformation components may be adapted to deform the permanent magnets such that the torque at the rotor shaft remains at a constant level, and—at the same time—the current in the stator is decreased. By decreasing the electric current in the stator and/or by maintaining the current as low as possible, the rotor and especially power electronics of the electric machine are protected against overheating and damages/destruction due to JOULE heat effects. At the same time, the torque at the rotor shaft is not decreasing.

Furthermore, the electric machine is flexible adapted to be operated as a motor and as a generator.

According to a third aspect of the present invention a powertrain is provided, wherein the powertrain includes an electric machine according to the second aspect of the invention.

According to a fourth aspect of the present invention, a car is provided, wherein the car includes a powertrain according to the third aspect of the invention. The car may be e.g. a motor vehicle such as a car, a motorcycle, a bus or a truck.

These and other aspects of the invention will be apparent from and elucidated with reference to the embodiments as per the drawings described hereinafter. In the following description, exemplary embodiments of the invention are explained with reference to the accompanying schematic drawing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

In the following an exemplary implementation of the invention is described. The figures show.

DETAILED DESCRIPTION OF THE PREFERRED EMBODIMENTS

The following description of the preferred embodiment(s) is merely exemplary in nature and is in no way intended to limit the invention, its application, or uses.

Figure 1:
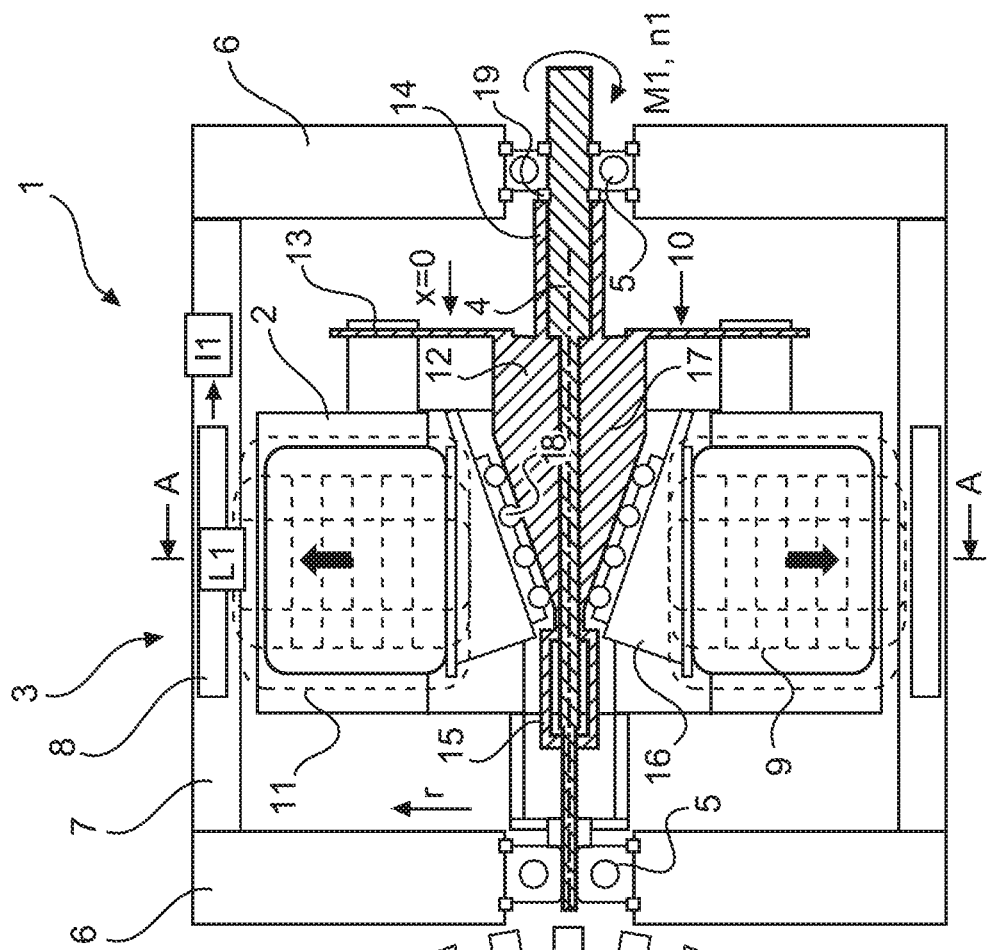
FIG. 1 shows a longitudinal sectional view (right) and a cross-sectional view (left) of an electric machine according to an embodiment of the invention of the electric machine in a first state.
Figure 1:
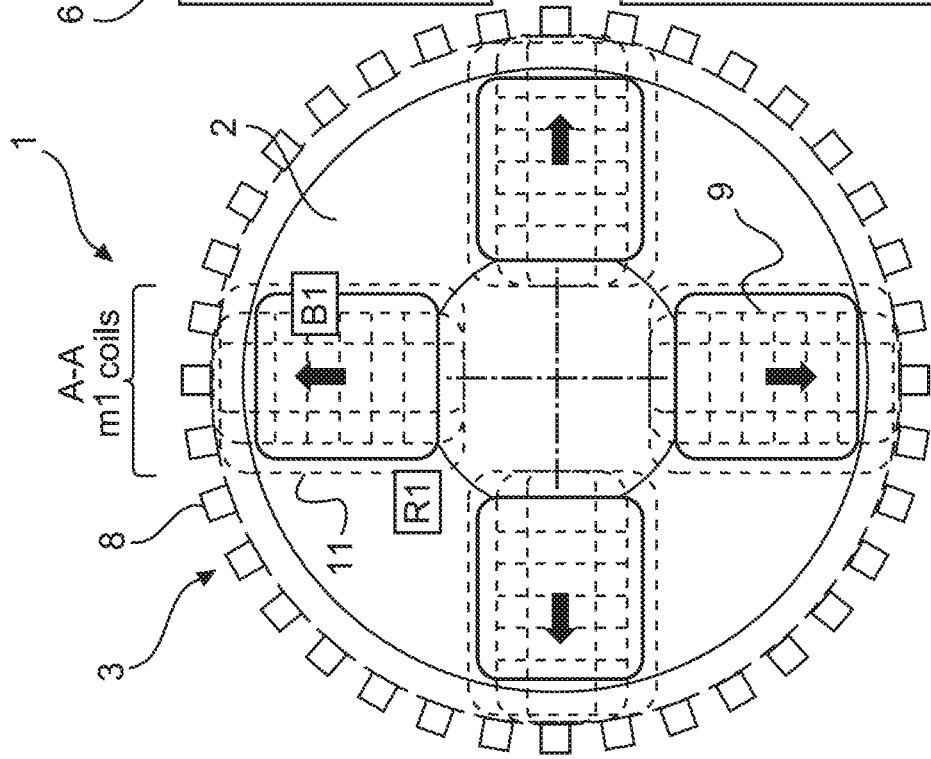

FIG. 1 shows an electric machine 1 for a powertrain (not shown) of a vehicle (not shown). The electric machine 1 includes a rotor 2 and a stator 3. The rotor 2 includes a shaft 4, which is rotatably mounted in two rolling bearings 5. The rolling bearings 5 are each mounted within a shield 6 of a housing 7 of the electric machine 1. The housing 7 also accommodates the stator 3 which surrounds the rotor 2.

In the shown exemplary embodiment, the stator 3 includes 36 stator coils 8 arranged in a circumferential direction around the stator 3, and the rotor 2 includes four permanent magnets 9 arranged in a circumferential direction around the rotor 2, wherein the permanent magnets 9 fulfil the function of a conductor. The permanent magnets 9 are adapted to be deformed elastically and may be made of a rubber ferrite forming a ferrite rubber block, as depicted by FIGS. 1 to 5. Alternatively, the permanent magnets 9 may include windings inserted into an elastic metrics material for high power needs.

The permanent magnets 9 each are accommodated in one reception of the rotor 2 such that the permanent magnets 9 may deform within the receptions. The electric machine 1 further includes deformation components 10, which are adapted to elastically deform the permanent magnets 9 such that at least one of a magnetic induction B characterized by a magnetic field 11, a conductor length L and a rotor radius R is reversibly adjusted.

The deformation components 10 may include an axial cam 12, a first spline element 13, a second spline element 14 and a third spline element 15 as well as one conical rod 16 assigned to each one of the permanent magnets 9 (thus, there are four conical rods 16 altogether).

When the shaft 4 is rotating, a torque M is transmitted from the shaft 4 to the second spline element and to the third spline element 15. In the shown embodiment, the first spline element 13, the second spline element 14 and the third spline element 15 are stiff and connected to the axial cam 12 in a one-piece manner. Thus, the transmitted torque M is further transmitted from the second spline element 13 to axial protrusions of the rotor 2. As a result, a torque M is transmitted from the shaft 4 to the rotor 2 by the spline elements 13 to 15.

In the shown embodiment, the axial cam 12 includes a conical part 17 corresponding to the conical rods 16, and the conical rods 16 each include a roller system 18. The roller system 18 is rotatably arranged in the area of an inner surface of the conical rod 16 such that an outer surface of the conical part 17 of the axial cam 12 may roll on the conical rod 16 by use of the roller system 18.

Thereby the axial cam 12 may move forward continuously (i.e. to the left as per FIGS. 1 to 5) in a longitudinal direction x. At the same time, the conical rods 16 are moving continuously outward in a radial direction r due to the conical inner surfaces of the conical rods 16 and the outer surface of the conical part 17 of the axial cam 12. Each of the conical rods 16 further includes an outer surface (which may be formed substantial cylindrical) being in contact with one of the permanent magnets 9. Therefore, if the conical rods 16 are moving outward in the radial direction r, their outer surfaces are pressing against the permanent magnets 9. This pressing leads to a deformation of the permanent magnets 9. In the shown embodiment shown by FIGS. 1 to 4, the forward movement of the axial cam 12 leads to a deformation of the permanent magnets 9 such that the magnetic induction B, the conductor length L and the rotor radius R are increased simultaneously.

Similarly, the axial cam 12 may move backward (i.e. to the right as per FIGS. 1 to 5) in the longitudinal direction x, while—at the same time—the conical rods 16 are moving inward in the radial direction r. Therefore, if the conical rods 16 are moving inward in the radial direction r, the pressure applied to the permanent magnets 9 by the conical rods 16 is reduced. This reducing of pressure leads to an elastic re-deformation of the permanent magnets 9 back to their initial forms. In the shown embodiment shown by FIGS. 5 to 8, the backward movement of the axial cam 12 leads to a deformation of the permanent magnets 9 such that the magnetic induction B, the conductor length L and the rotor radius R are decreased simultaneously.

Thus, the elastic deformation of the respective permanent magnet 9 depends on a position of the axial cam 12 on the x-axis and, correspondingly, on the position of the respective conical rod 16 in the radial direction.

The electric machine 1 may further include a device (not shown) for moving the axial cam 12 forward in an axial direction x (i.e. to the left as per FIGS. 1 to 5). Such devices may e.g. include electromagnetic magnetic device being adapted for generating a magnetic field to push the actual cam 12 forward in the actual direction x. Alternatively or additionally, a mechanical mechanism may be implemented to push the actual cam 12 forward in the actual direction x. To move the axial cam 12 backward in the actual direction x (i.e. to the right as per FIGS. 1 to 5), the electric machine 1 may use the re-deformation of the permanent magnets 9 back to their initial forms. This re-deformation may automatically lead to a movement of the axial cam 12 back to its position as shown in FIG. 1.

FIG. 1 shows the axial cam 12 in a first axial end position (utmost right according to FIG. 1) and the conical rods 16 in a first radial end position (utmost inward according to FIG. 1). In the first axial end position, an axial front side of the second spline element 14 of the axial cam 12 abuts against a stopper element 19 assigned to the rolling bearing 5 shown right in FIG. 1. In their first radial end positions, the outer surfaces of the conical rods 16 exert minimum pressure on the permanent magnets 9 such that the permanent magnets 9 are not deformed or only deformed slightly. In the state as per FIG. 1, the rotor shaft 4 rotates at a first rotation speed n1 (which may be the maximum rotation speed nmax of the rotor 2) and delivers a torque M1 at a first stator current I1. Additionally, the permanent magnets generates a first magnetic induction B1 while the permanent magnets/conductors extend over a first length L1 (measured in the axial direction x) and the rotor extends over a first radius R1.

Figure 2:
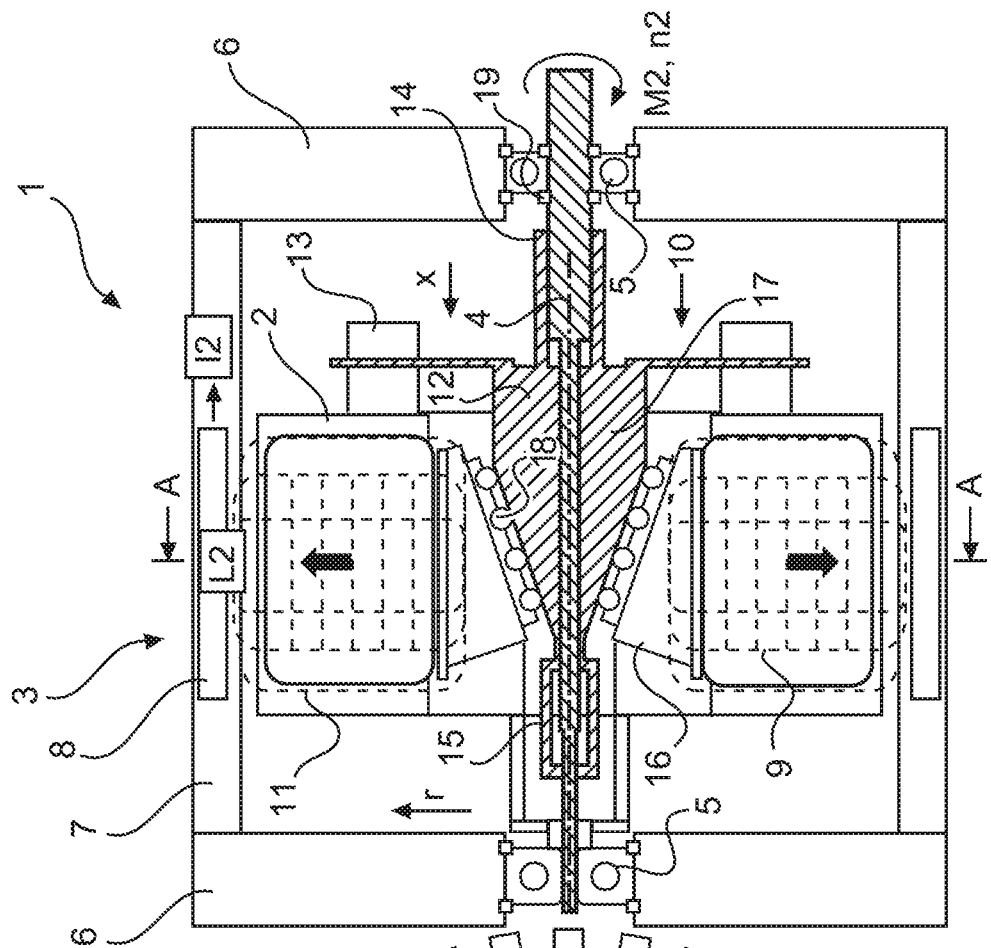
FIG. 2 shows a longitudinal sectional view (right) and a cross-sectional view (left) of the electric machine as per FIG. 1 in a second state.
Figure 2:
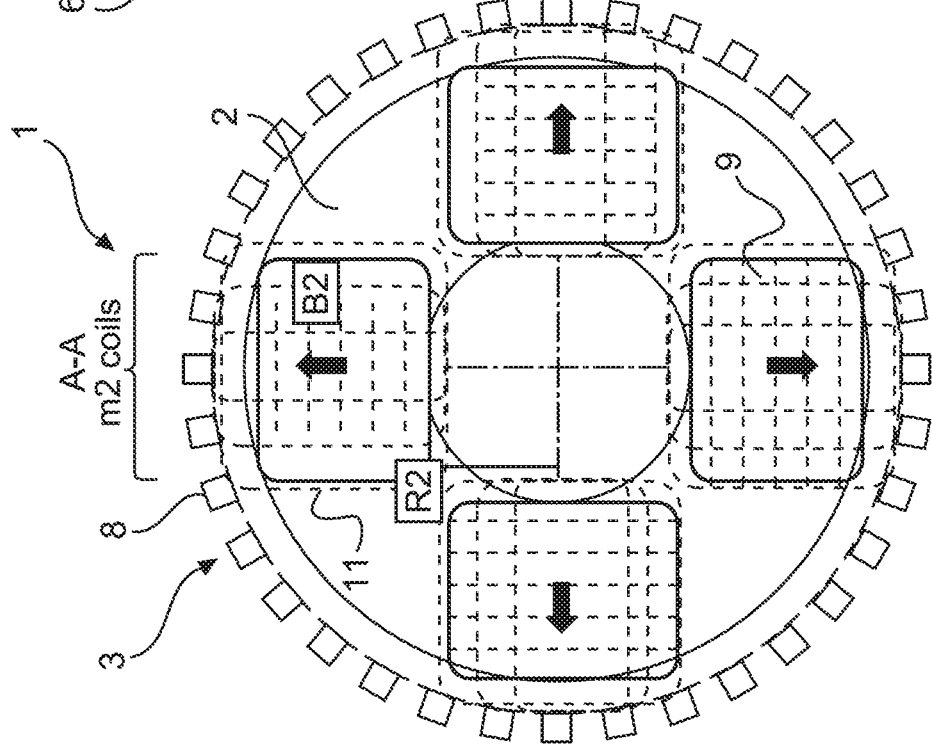

FIG. 2 shows the axial cam 12 in a second axial position (more left compared to the first axial position as per FIG. 1) and the conical rods 16 in a second radial position (more outward compared to the first axial position as per FIG. 1). In the second axial position, the axial front side of the second spline element 14 no longer abuts against the stopper element 19. In their second radial positions (as per FIG. 2), the outer surfaces of the conical rods 16 exert more pressure on the permanent magnets 9 than in their first radial end positions (as per FIG. 1).

Thereby, the permanent magnets 9 are deformed such that they extend over a second length L2 (further than L1) and the rotor extends over a second radius R2 (further than R1). Also, the permanent magnets 9 generate a second magnetic induction B2 (higher than B1). The second length L2, the second radius R2 and the second magnetic induction B2 lead to a second torque M2 delivered by the rotor shaft 4 at a second rotation speed n2 and at a second stator current I2. The second rotation speed n2 may be the same as the first rotation speed n1 (n=constant). Due to L2, R2 and B2 being increased compared to L1, R1 and B1, the second torque M2 may also be increased compared to the first torque M1. The second stator current I2 may be lower than the first stator current I1. Alternatively, the current in the stator is kept constant (I2=I1), while—at the same time—the torque is increased (M2>M1). Furthermore, the torque is kept at a constant level (M2=M1), while—at the same time—the stator current is decreased (I2<I1).

Figure 3:
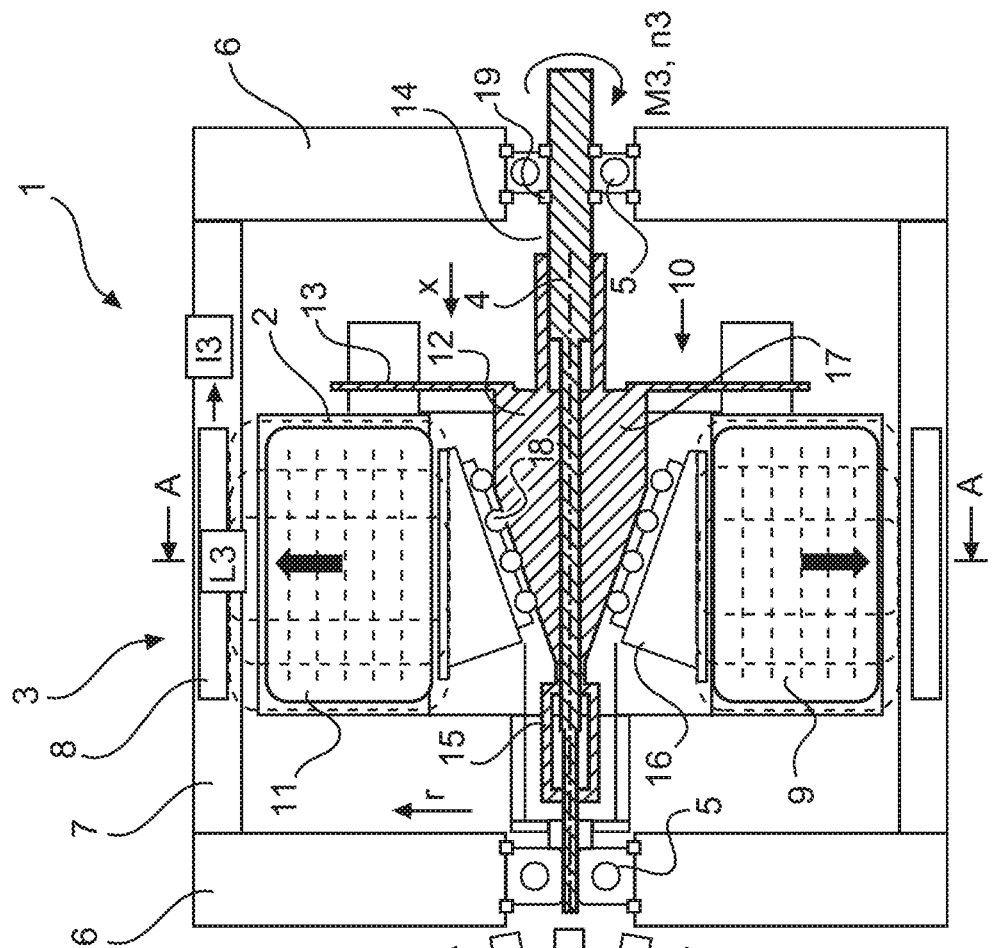
FIG. 3 shows a longitudinal sectional view (right) and a cross-sectional view (left) of the electric machine as per FIG. 1 in a third state.
Figure 3:
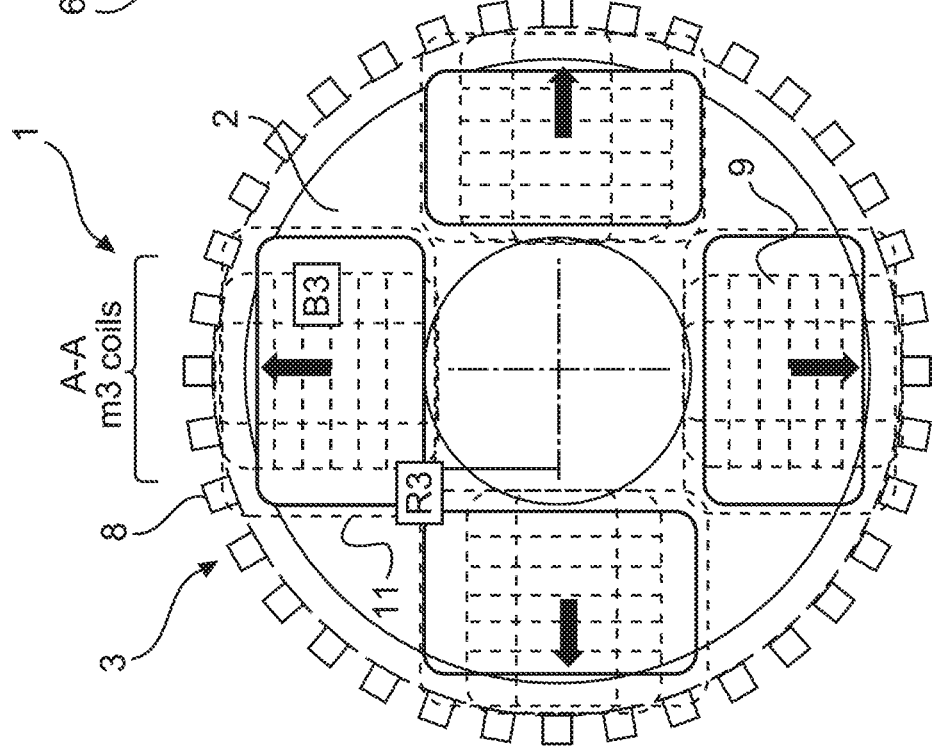

FIG. 3 shows the axial cam 12 in a third axial position (more left compared to the second axial position as per FIG. 2) and the conical rods 16 in a third radial position (more outward compared to the second axial position as per FIG. 2). In their third radial positions (as per FIG. 3), the outer surfaces of the conical rods 16 exert more pressure on the permanent magnets 9 than in their second radial end positions (as per FIG. 2).

Thereby, the permanent magnets 9 are deformed such that they extend over a third length L3 (further than L2) and the rotor extends over a third radius R3 (further than R2). Also, the permanent magnets 9 each generate a third magnetic induction B3 (higher than B2). The third length L3, the third radius R3 and the third magnetic induction B3 lead to a third torque M3 delivered by the rotor shaft 4 at a third rotation speed n3 and at a third stator current I3. The third rotation speed n3 may be the same as the second rotation speed n2 (n=constant). Due to L3, R3 and B3 being increased compared to L2, R2 and B2, the third torque M3 may also be increased compared to the second torque M3. The third stator current I3 may be lower than the second stator current I2. Alternatively, the current in the stator may be kept constant (I3=I2), while—at the same time—the torque is increased (M3>M2). Furthermore, the torque may be kept at a constant level (M3=M2), while—at the same time—the stator current is decreased (I3<I2).

Figure 4:
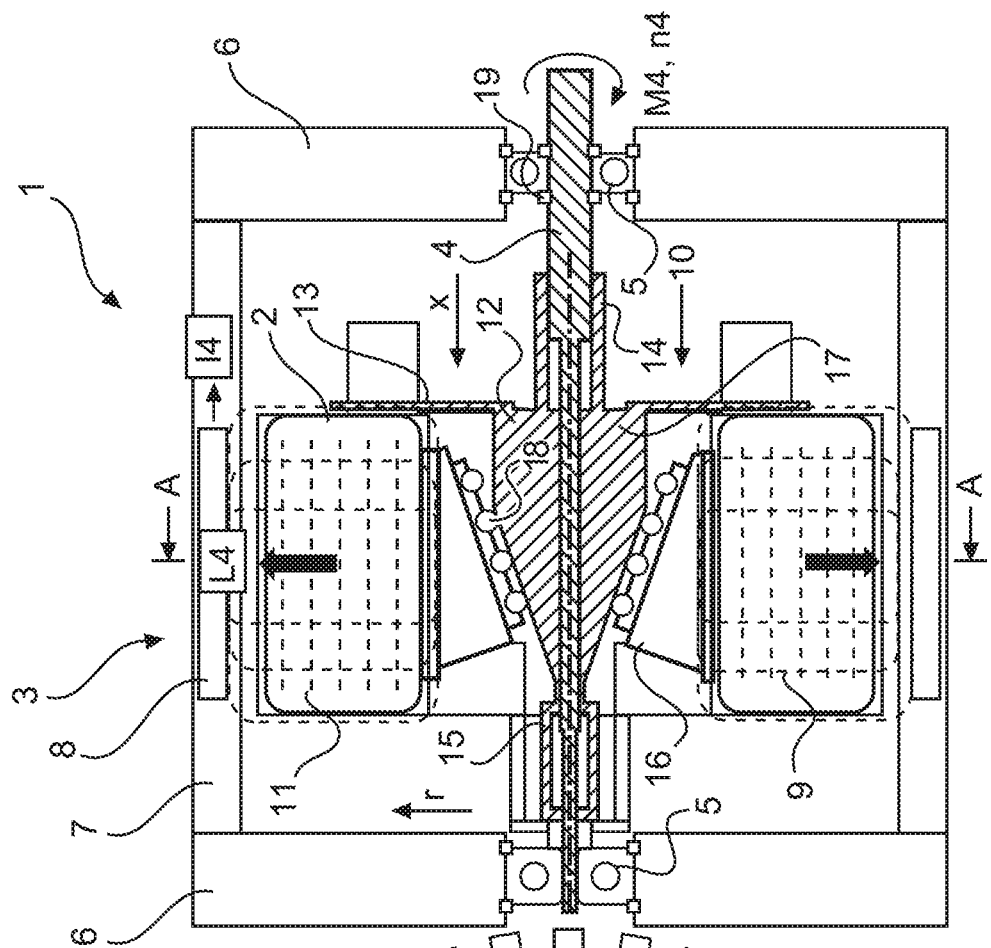
FIG. 4 shows a longitudinal sectional view (right) and a cross-sectional view (left) of the electric machine as per FIG. 1 in a fourth state.
Figure 4:
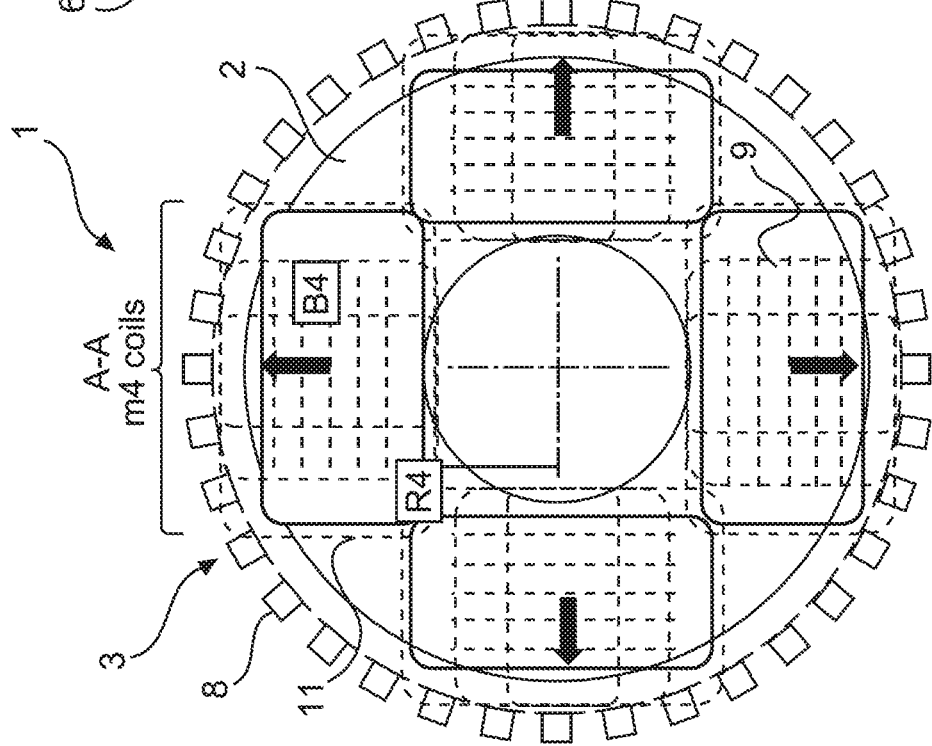

FIG. 4 shows the axial cam 12 in a fourth axial end position (utmost left according to FIG. 4) and the conical rods 16 in a fourth radial end position (utmost outward according to FIG. 4). In the fourth axial end position, a surface (facing left in FIG. 4) of the third spline element 15 of the axial cam 2 abuts against another stopper surface (facing right in FIG. 4) of the rotor 2. In their fourth radial end positions (as per FIG. 4), the outer surfaces of the conical rods 16 exert maximum pressure on the permanent magnets 9 (higher pressure than in their radial positions as per FIGS. 1 to 3).

Thereby, the permanent magnets 9 are deformed such that they extend over a fourth (maximum) length L4 (further than L3) and the rotor extends over a fourth (maximum) radius R4 (further than R3). Also, the permanent magnets 9 each generate a fourth (maximum) magnetic induction B4 (higher than B3). The fourth length L4, the fourth radius R4 and the fourth magnetic induction B4 lead to a fourth torque M4 delivered by the rotor shaft 4 at a fourth rotation speed n4 and at a fourth stator current I4. The fourth rotation speed n4 may be the same as the third rotation speed n3 (n=constant). Due to L4, R4 and B4 being increased compared to L3, R3 and B3, the fourth torque M4 may also be increased compared to the third torque M3. The fourth stator current I4 may be lower than the third stator current I3. Alternatively, the current in the stator is kept constant (I4=I3), while—at the same time—the torque is increased (M4>M3). Furthermore, the torque may be kept at a constant level (M4=M3), while—at the same time—the stator current is decreased (I4<I3).

Figure 5:
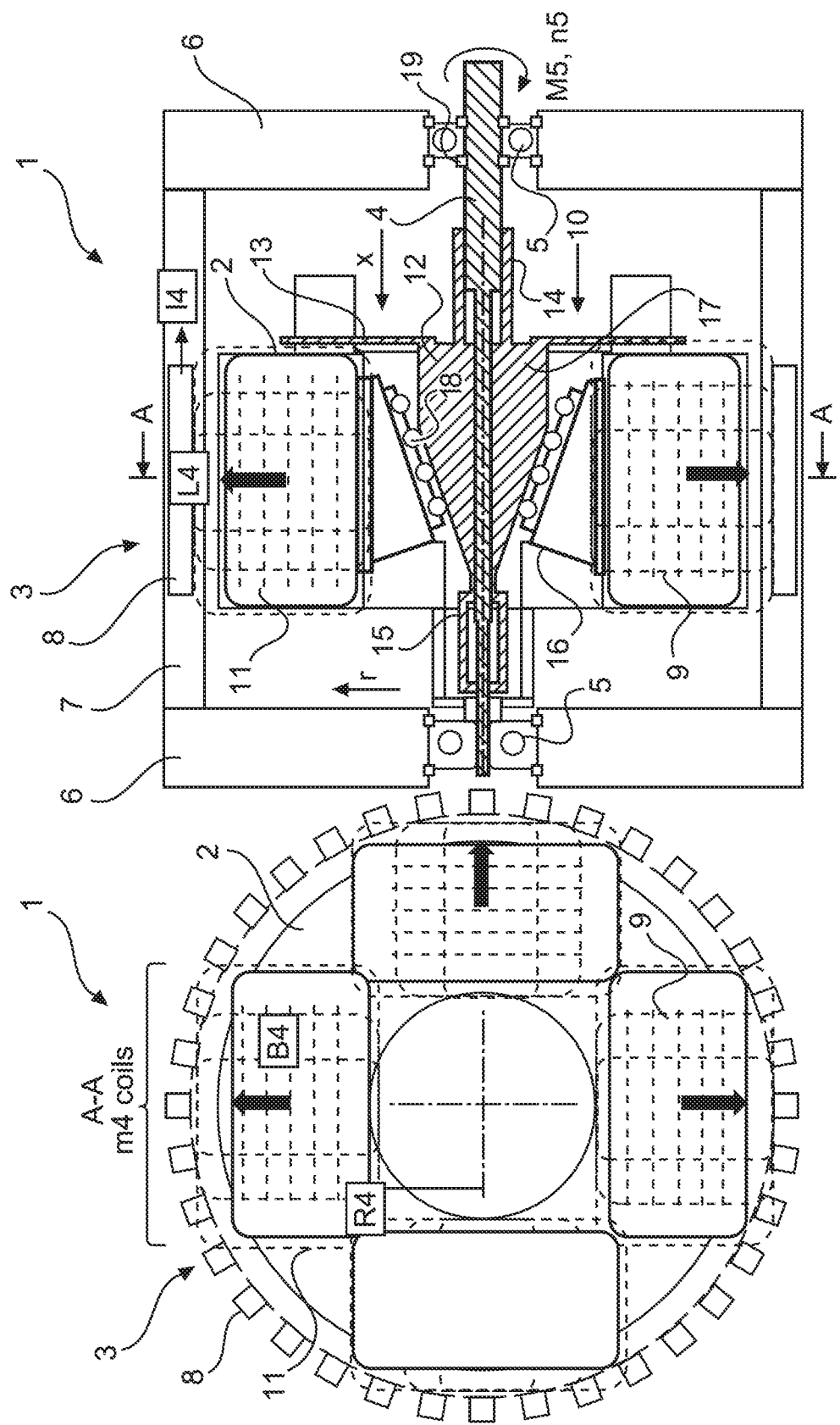
FIG. 5 shows a longitudinal sectional view (right) and a cross-sectional view (left) of the electric machine as per FIG. 1 in a fifth state.

FIG. 5 shows the axial cam 12 in its fourth axial end position and the conical rods 16 in their fourth radial end position as per FIG. 4. Therefore, the permanent magnets 9 are deformed having the fourth length L4, the rotor extending over the fourth radius R4, and the permanent magnets 9 each generating the fourth magnetic induction B4 as per FIG. 4. The rotation speed of the rotor shaft may be kept constant (n5=n4), also. The stator current may be decreased further (compared to the state as per FIG. 4) down to a value of I5 (I5 is a minimum stator current value). Due to constant L4, R4 and B4 and decreased I5, a fifth torque M5 may also be decreased compared to the fourth torque M4.

By moving the axial cam 12 backward in the axial direction x (into the right direction as per FIGS. 1 to 5), the axial cam 12 may be moved back continuously towards and into its first axial end position as per FIG. 1, and the conical rods 16 are moved back continuously towards and into their first radial end position as per FIG. 1. The backward movement of the axial cam 12 may lead to the deformation states of the permanent magnets 9 as per FIGS. 1 to 3 with conductor lengths L1 to L3 and rotor radii R1 to R3, magnetic inductions B1 to B3, torques M1 to M3 and stator currents I1 to I3 at rotation speeds n1 to n3.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotor for an electric machine of a vehicle, the rotor comprising:
   permanent magnets, the permanent magnets being adapted to be deformed elastically;
   receptions for the permanent magnets, the permanent magnets are arranged within the receptions; and
   deformation components further comprising an axial cam;
   wherein the receptions are designed such that the permanent magnets deform within the receptions, and the deformation components are adapted to deform the permanent magnets such that at least one of a magnetic induction, a conductor length, or a rotor radius is adjusted;
   wherein the axial cam is adapted to be moved forwards and backwards in an axial direction of the rotor, and a forward movement of the axial cam leads to a deformation of the permanent magnets such that at least one of the magnetic induction, the conductor length, or the rotor radius is increased.

2. The rotor of claim 1, wherein the permanent magnets are made of a rubber ferrite.

3. The rotor of claim 1, wherein the axial cam is adapted to be moved backwards in the axial direction of the rotor.

4. The rotor of claim 3, wherein a backward movement of the axial cam leads to a back-deformation of the permanent magnets such that at least one of the magnetic induction, the conductor length and the rotor radius is decreased.

5. An electric machine for a vehicle comprising:
   a rotor, further comprising:
      permanent magnets, the permanent magnets being adapted to be deformed elastically;
      receptions for the permanent magnets, the permanent magnets are arranged within the receptions; and
      deformation components further comprising an axial cam;
      wherein the receptions are designed such that the permanent magnets deform within the receptions, and the deformation components are adapted to deform the permanent magnets such that at least one of a magnetic induction, a conductor length, or a rotor radius is adjusted;
      wherein the axial cam is adapted to be moved forwards and backwards in an axial direction of the rotor, and a forward movement of the axial cam leads to a deformation of the permanent magnets such that at least one of the magnetic induction, the conductor length, or the rotor radius is increased.

6. The electric machine of claim 5, the rotor further comprising:
   a rotor shaft; and
   a stator;
   wherein the deformation components are adapted to deform the permanent magnets such that a current in the stator remains at a constant level, and at the same time, a torque of the rotor shaft is increased.

7. The electric machine of claim 5, the electric machine further comprising:
   a rotor shaft; and
   a stator;
   wherein the deformation components are adapted to deform the permanent magnets such that a torque at the rotor shaft remains at a constant level, and at the same time, a current in the stator is decreased.

8. The electric machine of claim 5, wherein the electric machine is adapted to be operated as a motor and as a generator.

9. The electric machine of claim 5, wherein the electric machine is used as part of a powertrain for a vehicle.

* * * * *